(No Model.)

J. D. CHAMLEE.
HORSE DETACHER.

No. 436,400. Patented Sept. 16, 1890.

Witnesses.
A. Ruppert.
G. B. Towles.

Inventor.
Jeff. D. Chamlee
Per
Thomas R. Simpson
Atty

UNITED STATES PATENT OFFICE.

JEFF D. CHAMLEE, OF LEVITA, TEXAS.

HORSE-DETACHER.

SPECIFICATION forming part of Letters Patent No. 436,400, dated September 16, 1890.

Application filed February 28, 1890. Serial No. 342,111. (No model.)

*To all whom it may concern:*

Be it known that I, JEFF D. CHAMLEE, a citizen of the United States, residing at Levita, in the county of Coryell and State of Texas, have invented certain new and useful Improvements in Singletrees for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a compound singletree which, with certain attachments, will hold the traces securely or allow them to be drawn off the hooks if the horse should run; also, to hold up the shafts while the horse is passing therefrom.

Figure 1:
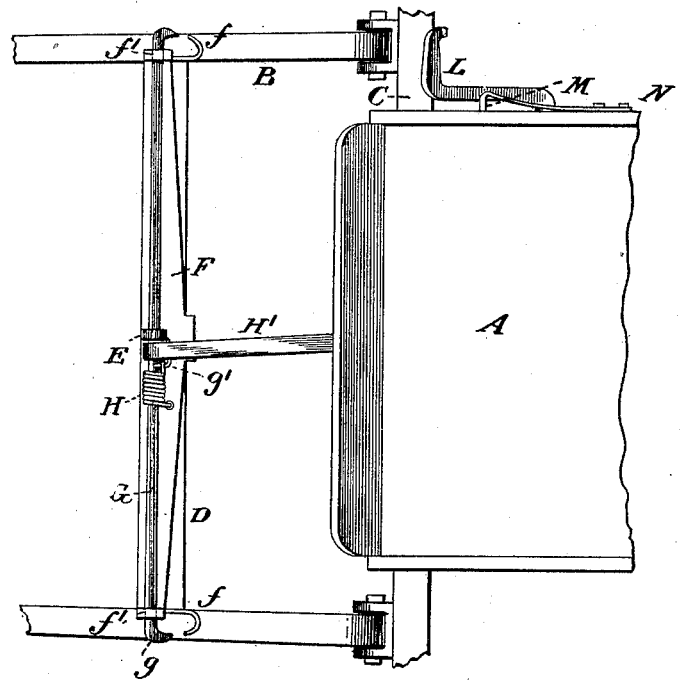
Figure 2:
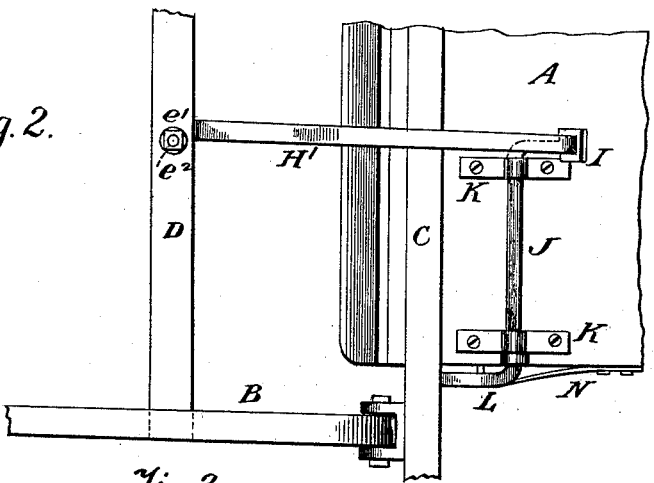
Figure 3:
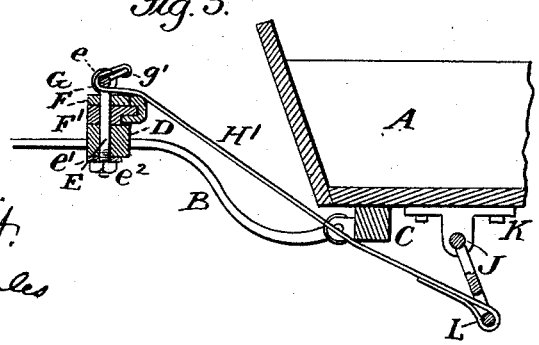

Figure 1 of the drawings is a top plan view; Fig. 2, a bottom view, and Fig. 3 a vertical longitudinal section.

In the drawings, A represents the body of a buggy or other single-horse vehicle; B, the thill-frame, which is rear-pivoted to the axle C in the usual way, and D the cross-bar, on which the singletree is middle-pivoted to turn horizontally. For this pivot I use an eye-screw E, the eye of the screw being above the flat bar F, while, after passing through said bar F, the spacer F', and the cross-bar D, the lower end receives a washer $e'$ and nut $e^2$. Each end of the flat bar F is turned up at right angles and provided with a hole $f'$, and each of the turn-ups extended rearwardly on an outer curve so as to form a hook $f$. Through the holes $f'$ $f'$ and screw-eye $e$ passes the draft-rod G, which turns loosely therein and is provided with a draft-hook $g$ at each end.

H is a spring, which encircles the draft-rod G and is fastened at the ends to the rod and flat bar F, respectively, so as to hold the point of hook $g$ opposite to that of the fixed hook $f$ on bar F and prevent the possibility of escape to the trace. The draft-rod G also has near its middle a loop $g'$, to which is secured one end of a strap H', passing over and under the rod, thence to the stirrup I on a crank-arm of the shaft J, which turns in the bearings K K, made fast to the bottom of the body A. This shaft extends out slightly beyond the side of the body and is there provided with a treadle-arm L. The arms I L are arranged on opposite sides of the shaft J. Ordinarily the treadle-arm L will rest on the stop M, when the strap is loose and the spring performs its functions of making the hooks $f$ $g$ co-operate to hold the traces so that they cannot possibly escape. If the horse is unruly or runs, the driver puts his foot on the treadle M and forces it forward, when the strap H' will turn the draft-rod over and hold up the thills while the horse moves out of the shafts, the breeching-straps passing from the open end of their tug-hook.

N is a spring-catch against which the treadle is held so as to hold the draft-hooks up in a convenient position to receive the ends of traces in "hitching up."

What I claim as new, and desire to protect by Letters Patent, is—

The combination, with the spring-held vibratory draft-rod G, having the loop $g'$, of the strap H' and the shaft J, the latter carrying the oppositely-placed stirrup-arm I and treadle-arm L, as set forth.

In testimony whereof I affix my signature in presence of two witnesses.

JEFF D. CHAMLEE.

Witnesses:
W. C. MILES,
F. W. RANKINS.